(12) United States Patent
Meyers (10) Patent No.: US 12,145,177 B2
(45) Date of Patent: Nov. 19, 2024

(54) METHOD FOR RETRIEVING A MOBILE PLATFORM FROM A TANK HAVING ENERGETIC SUBSTANCES

(71) Applicant: TANKBOTS, INC., Houston, TX (US)

(72) Inventor: Julian W. Meyers, Houston, TX (US)

(73) Assignee: TANKBOTS, INC., Houston, TX (US)

( * ) Notice: Subject to any disclaimer, the term of this patent is extended or adjusted under 35 U.S.C. 154(b) by 580 days.

(21) Appl. No.: 17/434,360

(22) PCT Filed: Jun. 12, 2020

(86) PCT No.: PCT/US2020/037475
§ 371 (c)(1),
(2) Date: Aug. 26, 2021

(87) PCT Pub. No.: WO2021/251983
PCT Pub. Date: Dec. 16, 2021

(65) Prior Publication Data
US 2022/0305533 A1    Sep. 29, 2022

(51) Int. Cl.
*B08B 1/10* (2024.01)
*B08B 1/20* (2024.01)
*B66B 7/12* (2006.01)

(52) U.S. Cl.
CPC .................. *B08B 1/20* (2024.01); *B08B 1/10* (2024.01); *B66B 7/12* (2013.01)

(58) Field of Classification Search
CPC .... B08B 1/20; B08B 1/10; B66B 7/12; D06B 15/02; D06B 3/18
See application file for complete search history.

(56) References Cited

U.S. PATENT DOCUMENTS

| | | | |
|---|---|---|---|
| 2005/0087362 A1* | 4/2005 | Silverman | F16L 11/22 174/135 |
| 2022/0305533 A1* | 9/2022 | Meyers | B08B 1/20 |

FOREIGN PATENT DOCUMENTS

WO    WO-2020171811 A1 *    8/2020    ........... G01N 21/954

* cited by examiner

*Primary Examiner* — Sharidan Carrillo
(74) *Attorney, Agent, or Firm* — Crowe & Dunlevy, P.C.

(57) ABSTRACT

A method for retrieving a mobile platform from inside a tank having an energetic substance includes configuring a retrieval carrier to have an intermediate span for which a majority of a cross-sectional area includes a braided synthetic fiber rope having a porosity of at least ten percent and an elastic compressibility sufficient to reduce the porosity of the braided synthetic fiber rope by at least fifty percent. The intermediate span does not have a fluid tight passage enabling fluid communication between a location outside of the tank and the mobile platform. The method further includes configuring a retrieval assembly to have an energetic substance extractor that has opposing surfaces defining a passage, passing the intermediate span through the passage, and compressing the intermediate span between the opposing surfaces to extract a majority of the residue of the liquid energetic substance retained by the intermediate span upon entering the passage.

13 Claims, 7 Drawing Sheets

METHOD FOR RETRIEVING A MOBILE PLATFORM FROM A TANK HAVING ENERGETIC SUBSTANCES

TECHNICAL FIELD

This disclosure relates to methods and related devices for retrieving equipment used to perform tasks in a tank containing hazardous substances.

BACKGROUND

In many situations, tasks must be performed inside of enclosures that contain potentially hazardous substances, such as gaseous and/or liquid hydrocarbons. Often, the equipment operated in these enclosures are partially or completely submerged in the hazardous liquid substance. Therefore, any physical carrier used to connect to and pull the equipment from the tank will likely come into contact with the hazardous liquid substance. This contact will likely result in some portion of the hazardous liquid substance being retained by the physical carrier while the equipment is being retrieved.

The present disclosure is directed to methods and related systems for extracting hazardous liquid substances from a physical carrier used during retrieval of equipment operated in a tank containing one or more hazardous liquid substances.

SUMMARY

In aspects, the present disclosure provides a method for retrieving a mobile platform from inside a tank having a hatch and at least partially filled with an energetic substance. The method may include several configuring steps.

One configuring step includes configuring a retrieval carrier to have an intermediate span and an attachment end. A majority of a cross-sectional area of the intermediate span includes a braided synthetic fiber rope having a porosity of at least ten percent. The braided synthetic fiber rope has an elastic compressibility sufficient to reduce the porosity of the braided synthetic fiber rope by at least fifty percent. The intermediate span does not have a fluid tight passage enabling fluid communication between a location outside of the tank and the mobile platform.

Another configuring step includes configuring the mobile platform to have at least: at least one enclosure and at least one propulsion system positioned at least partially inside the at least one enclosure.

Another configuring step includes configuring a retrieval assembly to have at least: a retrieval frame, an energetic substance extractor, and a retrieval winch. The retrieval frame supports the retrieval carrier. The energetic substance extractor is positioned between the retrieval frame and the mobile platform. The retrieval winch is connected to the winch end of the retrieval carrier.

Another configuring step includes configuring the energetic substance extractor to have at least: a plurality of opposing surfaces defining a passage. The passage is sized to cause the opposing surfaces to have rolling contact with and compress the intermediate span of the retrieval carrier in the passage.

The method includes the further steps of: moving the mobile platform in the tank using the at least one propulsion system while the mobile platform is submerged in a liquid energetic substance; positioning at least the energetic substance extractor of the retrieval assembly adjacent to the hatch; and retrieving the mobile platform from inside the tank.

The retrieving step includes the steps of: connecting the attachment end of the retrieval carrier to the mobile platform, operating the retrieval winch to pull the intermediate span of the retrieval carrier toward the retrieval winch, and passing the intermediate span of the retrieval carrier through the passage while the intermediate span of the retrieval carrier is being pulled toward the retrieval winch.

During the retrieval step, the intermediate span of the retrieval carrier passes through the passage and applies a torque at the rolling contact with the opposing surfaces. The applied torque rotates the opposing surfaces.

The intermediate span of the retrieval carrier that was submerged in the liquid energetic substance can retain a residue of the liquid energetic substance upon entering the passage. Therefore, the method includes a further step of compressing the intermediate span of the retrieval carrier between the plurality of opposing surfaces. The compression extracts from the intermediate span in the passage a majority of the residue of the liquid energetic substance retained by the intermediate span of the retrieval carrier upon entering the passage.

The above-recited example of features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, references should be made to the following detailed description of the disclosure, taken in conjunction with the accompanying drawings, in which like elements have been given like numerals and wherein.

DETAILED DESCRIPTION

The present disclosure provides devices, systems, and methods for retrieving a mobile platform from a tank having liquid and/or gaseous hazardous substances. For conciseness and clarity, the description below is principally directed to systems and related methods for retrieving a mobile platform from a tank having an interior in which hazardous, energetic materials such as hydrocarbon liquids and/or gases are present. However, it is emphasized that the present teachings can be readily applied to other industries, substances, and uses.

Figure 1:
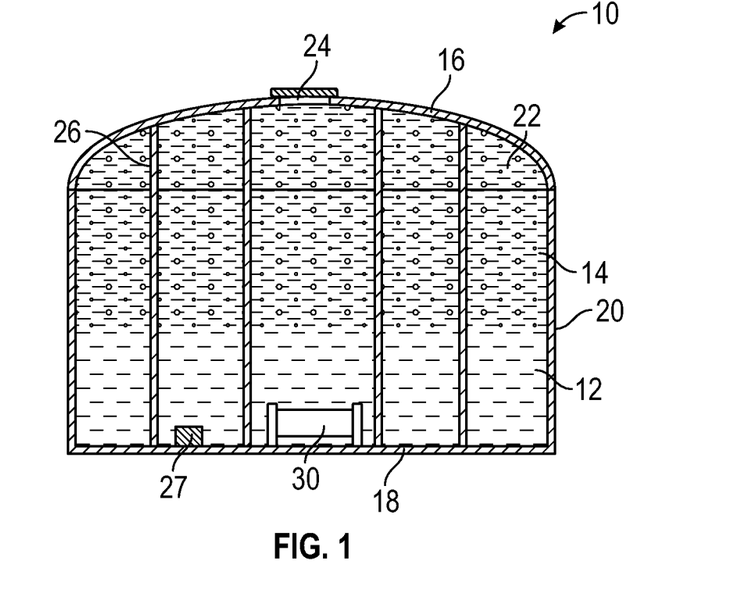
FIG. 1 sectionally illustrates a mobile platform inside a tank containing an energetic substance according to the present disclosure.

Referring initially to FIG. 1, a tank 10 may be used to store an energetic substance, such as hydrocarbons, in the form of a liquid body 12 and a vapor 14. The fluid-tight tank 10 may include a domed top wall 16, a generally planar bottom wall 18, and a cylindrical vertical wall 20. An interior 22 of the tank 10 may be accessed via a hatch 24. In some tanks, pillars 26 may be used for structural support or other uses. Also, it is common for the tank 10 to also contain objects 27, which may be intentionally placed such as sumps, piping, supports, etc. or foreign material such as debris, dropped tools, chains, wires, etc. The tank 10 may be a fixed above-ground tank or an underground tank. The tank 10 may also be positioned on a vehicle or vessel such as a barge, ship, land vehicle, etc. Moreover, the tank 10 may employ different configurations; e.g., the top wall 16 may be flat and/or an interior floating roof may be used.

Periodically or as needed, the environment within the tank 10 may require inspection, evaluation, monitoring, refurbishment and/or repair. A suitably configured mobile platform 30 can be deployed inside the tank 10 to perform one or more tasks related to such activities. In aspects, the present disclosure provides retrieval methods and related retrieval systems that retrieve the mobile platform 30 after deployment in the tank 10. In further aspects, these retrieval methods and related retrieval systems actively extract most, if not all, of any liquid energetic substances retained by retrieval carriers used with these assemblies during the retrieval process.

Figure 2:
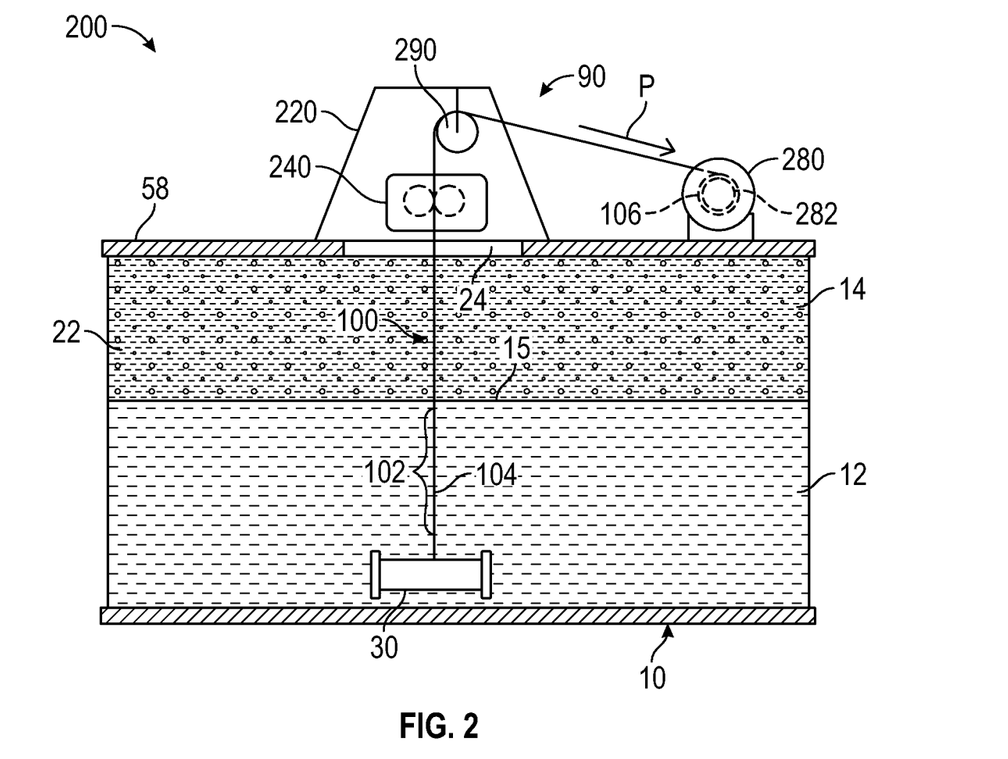
FIG. 2 schematically illustrates a retrieval assembly and retrieval carrier in accordance with one embodiment of the present disclosure that may be used to retrieve a mobile platform inside a tank containing an energetic substance.

Referring to FIG. 2, there is shown an embodiment of a retrieval system 90 that may be used to physically engage and retrieve the mobile platform 30 submerged in the liquid energetic substance 12 inside the tank 10, which can be similar to that described in FIG. 1. The tank 10 stores the liquid energetic substance 12 and a vapor energetic substance 14 within an interior 22 of the tank 10 that can be accessed via a hatch 24. The retrieval system 90 includes a retrieval carrier 100 that physically connects to the mobile platform 30 and a retrieval assembly 200 that can physically manipulate the mobile platform 30 using the connected retrieval carrier 100. The retrieval assembly 200 extracts some or all of the residue of the liquid energetic substance 12 the retrieval carrier 100 may retain from direct or indirect contact with the liquid energetic substance 12.

The retrieval carrier 100 may be a belt, wire, rope, cable, or other elongated member that operatively connects the mobile platform 30 with the retrieval assembly 200. By operatively connect, it is meant that the retrieval assembly 200 can use the retrieval carrier 100 to lift, handle, or otherwise physically manipulate the mobile platform 30. The retrieval carrier 100 has an intermediate span 102 interposed between an attachment end 104 that physically connects to the mobile platform 30 and a winch end 106 that physically engages a retraction device such as a retrieval winch 280, which will be discussed in greater detail below. The attachment end 104 may include a suitable connector (not shown) for connecting with the mobile platform 30. The winch end 106 is generally a length of the retrieval carrier 100 that the retrieval winch 280 winds in order to lift the mobile platform 30 toward the hatch 24.

In aspects, the intermediate span 102 is defined by a portion of the retrieval carrier 100 that physically contacts the liquid energetic substance 12 while retrieving the mobile platform 30 from inside the tank 10. Thus, as shown in FIG. 2, the intermediate span 102 is generally defined by a portion of the retrieval carrier 100 that has been at or below an energetic liquid surface 15. The intermediate span 102 may not necessarily have a clear physical delineation with the attachment end 104 and/or the winch end 106. That is, for example, the intermediate span 102, the attachment end 104, and the winch end 106 may all be formed of the same material and use the same construction. Nevertheless, in some arrangements, the intermediate span 102 does not overlap the attachment end 104 so as to reach the mobile platform 30.

Figure 3:
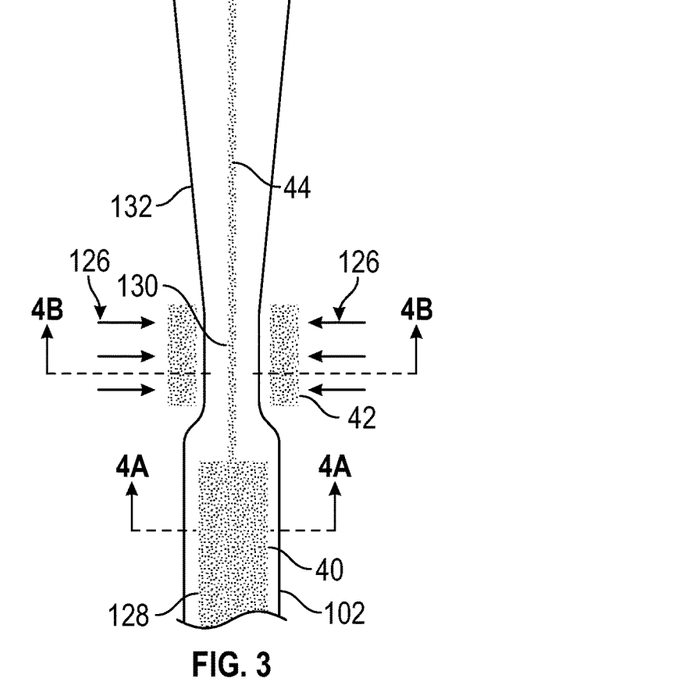
FIG. 3 schematically illustrates the deformation of an intermediate span of a retrieval carrier passing prior to, during, and after interacting with an energetic substance extractor according to one embodiment of the present disclosure.
Figure 4A:
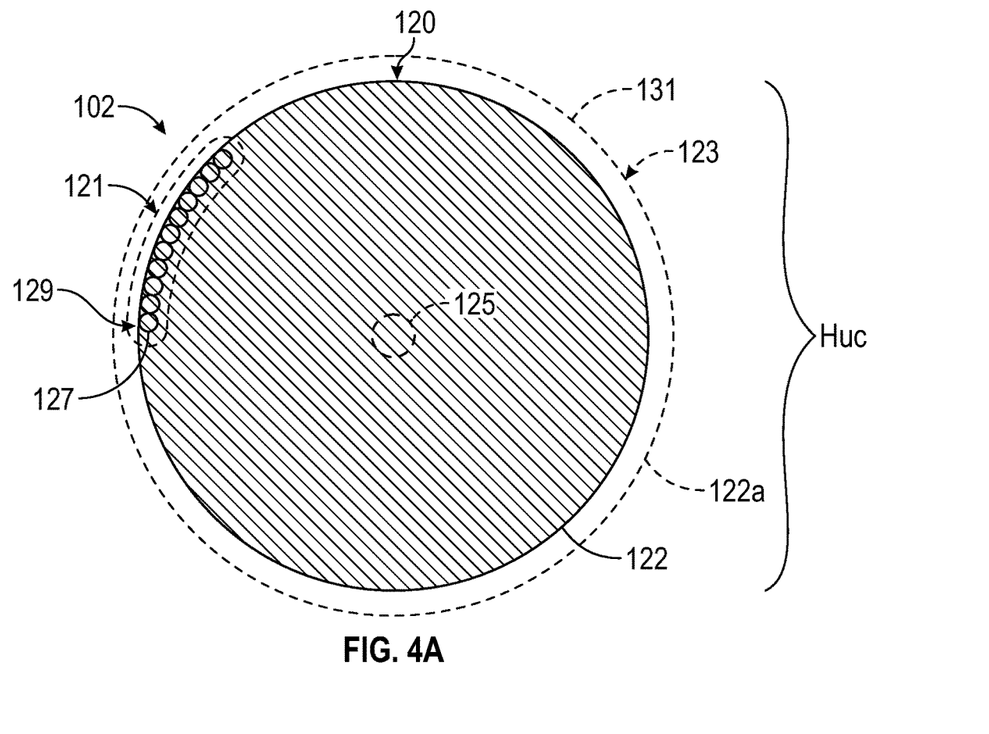
FIGS. 4A-B illustrate cross-sectional views of a retrieval carrier according to one embodiment of the present disclosure before and during compression, respectively.

A non-limiting configuration of the intermediate span 102 is shown in FIG. 4A, which illustrates a section 4A-4A (FIG. 3) of the intermediate span 102 of the retrieval carrier 100. The intermediate span 102 may be a homogenous body formed of only one material or be a composite body formed of two or more components.

In some embodiments, the intermediate span 102 can be partially or completely formed of a braided synthetic fiber rope 120. Braided synthetic fiber rope 120 is representative of a class of materials that is elastically compressible, as described below, and has a porosity that can be varied by selective application of compressive forces. Illustrative, but not exhaustive, materials for the braided synthetic fiber rope 120 include nylon, polyester, polypropylene, aramid, and high modulus polyethylene.

Optionally, additional components in the intermediate span 102 may include an outer sheath 123 and/or one or more wires 125. An outer sheath may be a lining, layer, coating, or any other structure partially or completely encasing the braided synthetic fiber rope 120. The wire 125 may be a cord, rope, strands, or any other continuous or segmented elongated member. These and other components may be used to add characteristics such as resistance to fraying or other damage, oil-resistance, water-resistance, strength, electrical charge dissipation, etc.

The intermediate span 102 may be configured with respect to a cross-sectional area within a perimeter 122 that encompasses all components making up the intermediate span 102. If the optional outer sheath 123 is not present, then the perimeter 122 may be defined by outer surfaces 127 of the outermost fibers 129 of the braided synthetic fiber rope 120. An illustrative outer surface 127 of an outermost fiber 129 is shown in a portion 121 of the braided synthetic fiber rope 120. If the optional outer sheath 123 is present, then an outer surface 131 of the optional outer sheath 123 defines a perimeter 122a for the intermediate span 102.

In some arrangements, when not subjected to a compressive force, a majority (i.e., more than fifty percent) of the cross-sectional area of the intermediate span 102 is formed of the braided synthetic fiber rope 120. In such arrangements, the remainder of the cross-sectional area may be composed of an outer sheath or different materials such as metal wires or cables. In other arrangements, the braided synthetic fiber rope 120 may make up over eighty percent, over ninety percent, or all of the cross-sectional area of the intermediate span 102.

In some arrangements, the intermediate span 102 does not have any wires, cables, or fibers that convey electrical power from outside of the tank 10 to the mobile platform 30. Consequently, in such arrangements, the retrieval carrier 100 does not transfer electrical power from outside of the tank 10 to the mobile platform 30. In some arrangements, the intermediate span 102 does not have any wires, cables, or fibers configured to convey data signals from outside of the tank 10 to the mobile platform 30. Therefore, in some arrangements the retrieval carrier 100 does not transfer data signals from outside of the tank 10 to the mobile platform 30. Exemplary data signals include, but are not limited to, information encoded electromagnetic signals that instruct a microprocessor or other computer component to take one or more actions, e.g., stop, start, change directions, etc.

Further, it should be noted that the intermediate span 102 does not have a fluid tight passage enabling fluid communication between a location outside of the tank 10 and the mobile platform 30. Thus, while the intermediate span 102 is permeable, as discussed below, and allows fluid penetration and fluid extraction, there are no conduits, channels, or any other passages that allow a fluid from outside of the tank 10 to traverse internally through the intermediate span 102 to the mobile platform 30. By way of example, gases, liquids, gels, or mixtures thereof cannot be pumped from a source external to the tank 10 via the intermediate span 102 to the mobile platform 30.

FIG. 3 illustrates a side view of one non-limiting embodiment of the intermediate span 102 that is configured to be elastically compressible and has variable porosity. By elastically compressible, it is meant that the intermediate span 102 compresses from a first shape and associated volume to a second smaller shape and associated smaller volume when subjected to a compressive force 126 and then reverts to at least eighty percent of a volume of the first shape after the compressive force 126 abates. Thus, the change in size may not be permanent. Of course, elastic compressibility may diminish after a certain number of cycles (e.g., ten or more compressions and decompressions). By variable porosity, it is meant that the amount of interstitial space in a cross section of the intermediate span 102 can be varied by applying a predetermined amount of compression to the intermediate span 102. Thus, generally, compressing a portion of the intermediate span 102 reduces a size, porosity and associated volume of the compressed portion.

Merely for ease of explanation, FIG. 3 depicts the intermediate span 102 as having a first state 128, a second state 130, and a third state 132. The first state 128 represents a condition prior to application of the compressive force 126, the second state 130 represents a condition during application of the compressive force 126, and the third state 132 represents a condition after the compressive force 126 is no longer applied. It should be noted that the third state 132 may be generally the same size and shape of the first state 128, which is due to the elastic compressibility of the intermediate span 102. It should be understood that the depictions of the states 128, 130, and 132 do not indicate any particular structural feature or delineation of the intermediate span 102. Rather, the states 128, 130, 132 are merely transitory structural shapes/dimensions/volumes that portions of the intermediate span 102 take before, during, and after being subjected to a compressive force.

As described above, the intermediate span 102 may have a porosity that varies based on the magnitude of an applied compressive force. In some embodiments, the intermediate span 102 in an uncompressed condition can have a porosity of at least ten percent, at least twenty-five percent, at least thirty-five percent, or more than fifty percent. As used herein, the term porosity refers to the amount of interstitial space present in a cross-section of the intermediate span 102 that can retain a fluid that penetrates the intermediate span 102, the amount of interstitial space present being relative to the total area of that cross-section. By way of example, a porosity of ten percent means that approximately ten percent of the total area of a given cross-section of the intermediate span 102 consists of interstitial space. The interstitial space may be between fibers or inside individual fibers. An illustrative retained fluid is a liquid residue of the liquid energetic substance 12 (FIG. 2). When compressed, the porosity may be reduced by at least twenty five percent, at least fifty percent, or at least seventy five percent.

Due to the presence of interstitial spaces in a cross-section of the intermediate span 102, contact with the liquid energetic substance 12 can allow a portion of the liquid energetic substance 12 to penetrate and reside within the intermediate span 102. As used throughout, the term "residue" refers to a portion of the liquid energetic substance 12 that has penetrated into the intermediate span 102 and resides within the interstitial spaces of the intermediate span 102.

Referring to FIG. 2, the retrieval assembly 200 is configured to remove some or all of the residue of the liquid energetic substance 12 retained by the retrieval carrier 100 while retrieving the mobile platform 30 from inside the tank 10.

In one non-limiting arrangement, the retrieval assembly 200 includes a retrieval frame 220, an energetic substance extractor 240, and the retrieval winch 280. In this embodiment, the energetic substance extractor 240 is positioned between the retrieval frame 220 and the mobile platform 30. The retrieval frame 220 and the retrieval winch 280 cooperate to support and pull the retrieval carrier 100 and connected mobile platform 30 toward the retrieval winch 280. The retrieval frame 220 may be positioned above and adjacent to the hatch 24 as shown. In other embodiments, the retrieval 220 may have one or more sections positioned on other locations, such as vertically offset but still adjacent to the hatch 24 or on the ground or structures adjacent to the tank 10.

While being pulled toward the retrieval winch 280, a portion of the retrieval carrier 100 passes through the energetic substance extractor 240, which extracts liquid energetic substance residue from the retrieval carrier 100. The extracted liquid energetic substance residue may drip back into the interior 22 of the tank 10.

In one non-limiting arrangement, the retrieval frame 220 may be a rigid structure having a pulley 290 positioned vertically above the hatch 24. The structure may use any construction suitable for supporting the weight of the mobile platform 30 and the forces associated with lifting and handling the mobile platform 30. Suitable materials for the retrieval frame 220 include metals. The pulley 290 may be a wheel having an outer circumferential surface complementary to the shape of the retrieval carrier 100. The pulley 290 changes the direction of a force applied to the retrieval carrier 100 by the retrieval winch 280. It should be understood that the present disclosure is not limited to a specific pulley configuration, e.g., several wheels may be used. Further, while the pulley 290 is shown above the hatch 24, it should be understood that the pulley 290 can be positioned on other locations, such as vertically offset but still adjacent to the hatch 24 or on the ground or structures adjacent to the tank 10.

The retrieval winch 280 may include a winch spool 282 around which the winch end 106 of the retrieval carrier 100 winds. The winch spool 282 may be rotated manually or by using a suitable motor (not shown). During retrieval, the retrieval winch 280 exerts a pulling force P on the intermediate span 102 by winding the winch end 106 onto the winch spool 282. While the retrieval winch 280 is shown on the tank 10, it should be understood that the retrieval winch 280 can be positioned on other locations, such as on the ground or structures adjacent to the tank 10.

Figure 5:
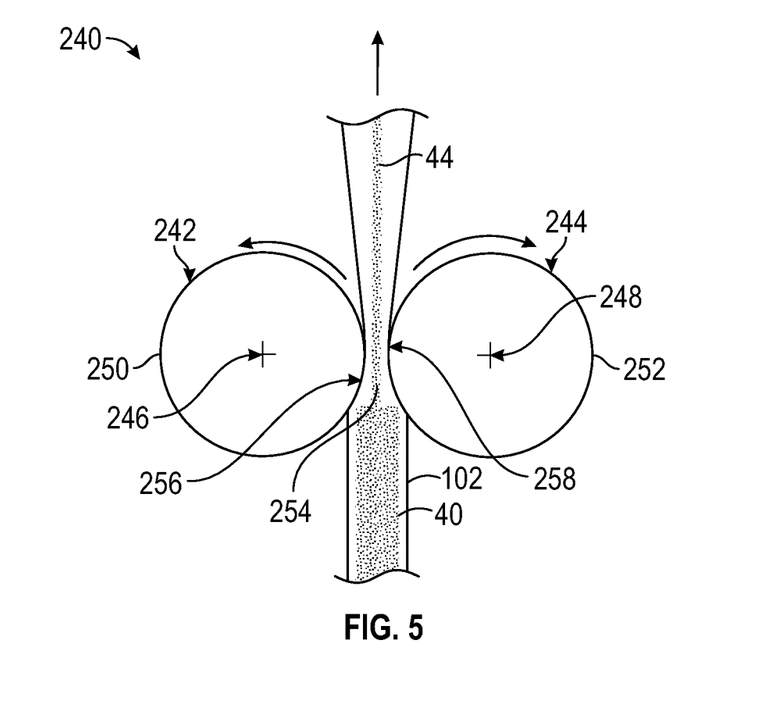
FIG. 5 schematically illustrates an energetic substance extractor extracting a liquid energetic substance from a retrieval carrier according to one embodiment of the present disclosure.

Referring to FIG. 5, there is shown one non-limiting embodiment of the energetic substance extractor 240 that can extract liquid energetic substance residue from the intermediate span 102 of the retrieval carrier 100. The energetic substance extractor 240 may include two or more rotating members such as rollers 242, 244. In some embodiments, the rollers 242, 244 may be formed as cylindrical bodies that rotate about respective axes of rotation 246, 248. The rollers 242, 244 each have outer surfaces 250, 252, respectively. Opposing surfaces 256, 258 of the outer surfaces 250, 252, respectively, form a passage 254 through which the intermediate span 102 passes. The outer surfaces 250, 252 may be planar surfaces that oppose one another to form the passage 254. Alternatively, one or both outer surfaces 250, 252 may be non-planar; e.g., concave, convex, "V" shaped, etc. In some embodiments, portions of the rollers 242, 244, such as the outer surfaces 250, 252, may be sufficiently compressible to allow debris and/or surface irregularities on the intermediate span 102 to pass through the passage 254 and thereby reduce damage to the intermediate span 102 and/or the rollers 242, 244. The elastic compressibility may be obtained by selecting a material for the rollers 242, 244 and/or a lining (not shown) on the outer surfaces 250, 252 that has a modulus of elasticity selected to deform when such debris and/or surface irregularities are encountered. Illustrative materials include, but are not limited to, metals such as aluminum alloys, elastomers such as urethane, and polymers such as PVC.

Figure 4B:
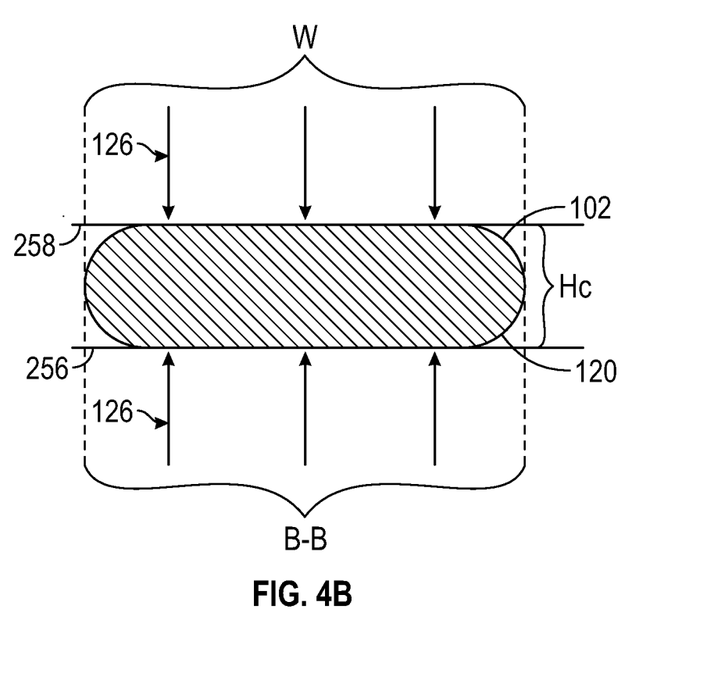

FIG. 4B illustrates a section 4B-4B (FIG. 3) of the intermediate span 102 of the retrieval carrier 100 (FIG. 2) that is inside the passage 254 (FIG. 5). For clarity, optional features such as an outer sheath 123 (FIG. 4A) and wires 125 (FIG. 4A) are not shown. Referring to FIGS. 4B and 5, the passage 254 (FIG. 5) is sized to compress the intermediate span 102 from the uncompressed shape shown in FIG. 4A to the compressed shape shown in FIG. 4B. The compression causes a reduction in the volume of the intermediate span 102 being compressed. In some embodiments, the passage 254 separating the opposing surfaces 256, 258 is sized no greater than 0.5 inches (1.27 centimeters) in some sections. This separation distance corresponds to the height He shown in FIG. 4B.

In FIG. 4B, the portion of the intermediate span 102 inside the passage 254 may be considered to have a width W measured along an axis parallel to the axes of rotation 246, 248. It should be understood that the term "parallel" is intended only to provide a general reference for relative alignment and does not imply any required geometric precision. The portion of the intermediate span 102 inside the passage 254 may also be considered to have a height He defined by the passage 254 separating the opposing surfaces 256, 258. The height He is aligned with an axis perpendicular to the axes of rotation 246, 248. The compressive forces 126 applied by the opposing surfaces 256, 258 reduce a height of the uncompressed intermediate span 102 from the uncompressed height Hue shown in FIG. 4A to the compressed height He of the compressed intermediate span 102 as shown in FIG. 4B.

In some arrangements, the opposing surfaces 256, 258 form the intermediate span 102 into a cross-sectional shape having a width W to a height He ratio of greater than five to one. In some embodiments, a majority of the perimeter 122, 122a defining a cross-sectional area of the intermediate span 102 of the retrieval carrier 100 contacts the opposing surfaces 256, 258. In other embodiments, at least eighty percent of the perimeter 122, 122a of the intermediate span 102 of the retrieval carrier 100 contacts the opposing surfaces 256, 258.

The coaction between the energetic substance extractor 240 and the intermediate span 102 of the retrieval carrier 100 will be described with reference to FIGS. 3 and 5. In FIG. 3, the first state 128 has a residue 40 while entering the passage 254. Because of the reduction in porosity of the second state 130 caused by the compressive forces 126, at least some of the residue 40 retained by the intermediate span 102 is forced out of and thereby extracted from the intermediate span 102. Other removal mechanisms, such as adhesion of the residue 40 to the opposing surfaces 256, 258 may also assist in extraction of the residue 40. The extracted portion of residue is labeled with numeral 42. In some situations, a remnant of residue 40 may still be retained by the third state 132 of the intermediate span 102 as shown with numeral 44.

It should be noted that the intermediate span 102 is resilient in that the compressed state may not be permanent. That is, when the compressive force is removed, the intermediate span 102 reverts to a volume of the prior uncompressed state. However, the intermediate span 102 may not revert to the same volume. That is, the volume of the third state 132 exiting the passage 254 may revert at least eighty percent of the volume of the first state 128 entering the passage 254. It should be noted that several minutes or longer may elapse before the intermediate span 102 reverts from the compressed state to the uncompressed state.

Referring to FIG. 5, an aspect of the present disclosure is that the intermediate span 102 rotates the opposing surfaces 256, 258 and therefore the rollers 242, 244. During retrieval, the retrieval winch 280 (FIG. 2) applies a pulling force P (FIG. 2) to the intermediate span 102. The pulling force P (FIG. 2) pulls the intermediate span 102 of the retrieval carrier 100 through the passage 254. The compression applied by the opposing surfaces 256, 258 is sufficiently high to generate frictional forces that cause rolling contact between the opposing surfaces 256, 258 and the intermediate span 102. That is, there is minimal, if any, sliding contact between the intermediate span 102 and the opposing surfaces 256, 258 along the direction of the force vector associated with the pulling force P (FIG. 2) acting on the intermediate span 102 in the passage 254. Therefore, the pulling force P (FIG. 2) can apply a torque at the rolling contact with the opposing surfaces 256, 258, which rotates the opposing surfaces 256, 258 about respective axes of rotation 246, 248.

It should be noted that the rollers 242, 244 are only rotated by the movement of the intermediate span 102. Specifically, there is no motor, manually powered device, or any other rotary power device that rotates the rollers 242, 244 independent of the intermediate span 102 while the intermediate span 102 is being used to retrieve the mobile platform 30 (FIG. 2).

Because the opposing surfaces 256, 258 do not scrape the outer surfaces of the intermediate span 102, the amount of abrasion, wear, laceration, or other damage the intermediate span 102 may otherwise suffer due to scraping while passing through the passage 254 is reduced. In some embodiments not shown, features such as bristles, brushes, and sponges, may be positioned to remove debris from the intermediate span 102 entering the passage 254. Such features may use a selected amount of sliding contact with the intermediate span 102 to dislodge such debris.

Figure 6A:
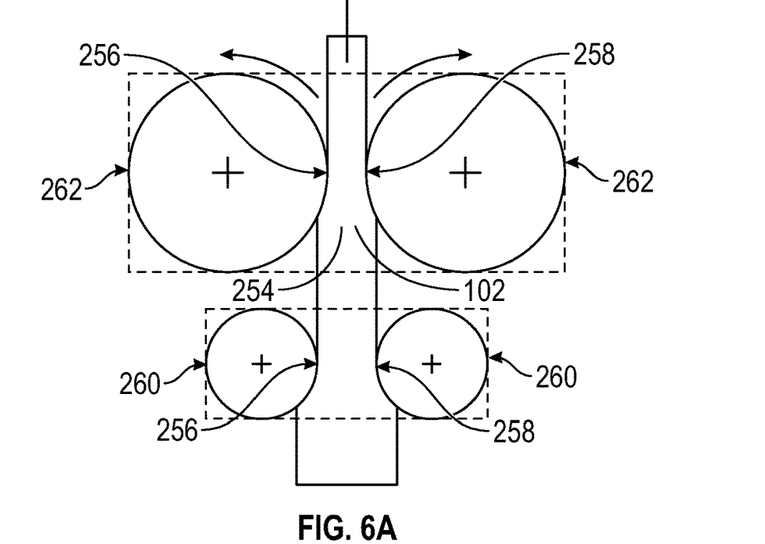
FIGS. 6A-C illustrate non-limiting embodiments of rotating elements used with energetic substance extractors according to the present disclosure.
Figure 6B:
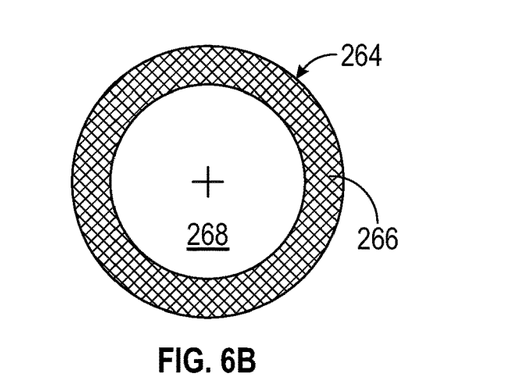
Figure 6C:
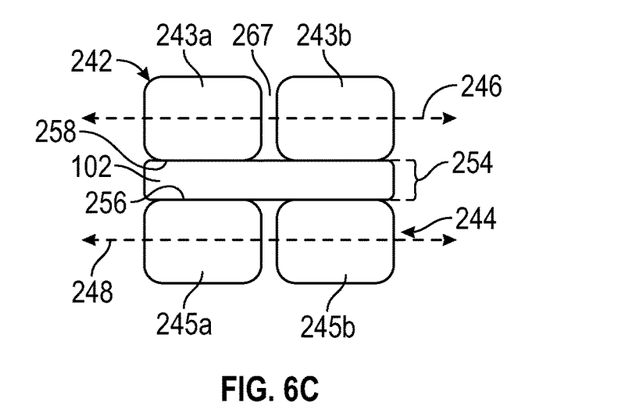

Referring to FIGS. 6A-C, there are design variants that may be used in connection with the energetic substance extractor 240 (FIG. 2). In FIG. 6A, opposing surfaces 256, 258 are formed on two separate sets of rollers 260, 262. The portion of the passage 254 through the roller set 260 may be larger than the portion of the passage 254 through the roller set 262. Thus, the compression may occur in stages as the intermediate span 102 passes serially from one roller set 260 to the next roller set 262. The relative sizing of the passages 254 may be reversed or staged in any desired variation. Alternatively, the size of the passage 254 between the opposing surfaces 256, 258 may remain constant. Referring to FIG. 6B, there is shown a rotating member 264 having a perforated outer surface 266 and a hollow interior 268. In such embodiments, some or all of the extracted fluids may pass into the hollow interior 268.

FIG. 6C illustrates an end view of an embodiment in which the rollers 242, 244 are segmented. For example, the roller 242 has two segments 243a,b, both of which rotate around axis 246 and roller 242 has two segments 245a,b, both of which rotate around axis of rotation 248. In this embodiment, some of the passage 254 separating the opposing surfaces 256, 258 is sized no greater than 0.5 inches (1.27 centimeters). However, there may be one or more recesses 267 that result in a larger separation distance between the opposing surfaces 256, 258. Therefore, generally, embodiments having a passage 254 with a maximum size of 0.5 inches (1.27 centimeters) may not have such a maximum size for the entire width of the passage 254.

The energetic substance extractor 240 (FIG. 5) is also susceptible to other variants not illustrated. For example, the relative positions of the rollers 242, 244 may be adjustable so that the size of the passage 254 may be increased or decreased, which then correspondingly increases or decreases the compressive force applied to the intermediate span 102. In some embodiments, the adjustability may be dynamic in that the passage 254 may temporarily increase in size to allow debris or other material to pass, which may reduce damage to the intermediate span 102 and/or the rollers 242, 244.

In some embodiments, the rollers 242, 244 may rotate independently from one another. In other embodiments not shown, the rollers 242, 244 may be operatively connected to one another such that their rotations are synchronized and/or the roller 242 can rotate the roller 244, or vice versa. For example, one or more gears (not shown) on each roller 242, 244 may rotationally link the roller 242 with the roller 244. The gears may include interlocking gear teeth or frictionally engaging surfaces. Intermediate gears may also be used to transfer the rotation between the roller 242 and the roller 244. Other devices such as belts may also be used to rotationally link the rollers 242, 244. Thus, the intermediate span 102 can rotate the rollers 242, 244 directly. Also, the intermediate span 102 can generate cause indirect rotation by using the roller 242 to rotate the roller 244, or vice versa.

Moreover, the rotating elements may be varied in number and spatial arrangement. For example, there may be three or more sets of rollers instead of two roller sets 260, 262 as shown in FIG. 6A. Likewise, there may be three or more side-by-side rotating elements instead of two side-by-side rotating elements as shown in FIG. 6C. Still other embodiments may use staggered or offset rotating elements. In still other embodiments, the rotating elements may be arranged to have the intermediate span 102 make multiple passes in the same direction or different directions through the energetic substance extractor 240.

In yet other embodiments, the rollers 242, 244 may be oriented differently from a horizontal arrangement shown in FIG. 2. In FIG. 2, the rollers 242, 244 may be described as stacked horizontally such that the intermediate span 102 passes vertically through the rollers 242, 244. In some embodiments not shown, the rollers 242, 244 may be stacked vertically such that the intermediate span 102 passes horizontally through the rollers 242, 244. Of course, the rollers 242, 244 may also be oriented at any angle between a horizontal angle and a vertical angle. Where two or more sets of rollers are used, all roller sets may be stacked using the same angular orientation or by using two or more different angular orientations. For example, one roller set may be horizontally stacked, and another roller set may be vertically stacked.

As should be evident from the above, the retrieval system 90 of FIG. 2 may be used to retrieve various types of equipment from inside of the tank 10 while simultaneously extracting residual energetic substances contained in the tank 10 from such equipment and/or a carrier used to retrieve such equipment. One non-limiting type of equipment that may be retrieved by the retrieval system 90 is a mobile platform that can perform one or more tasks inside the tank 10 without need for real time control or power from a location outside of the tank 10. An illustrated mobile platform 30 is described with reference to FIG. 7.

Figure 7:
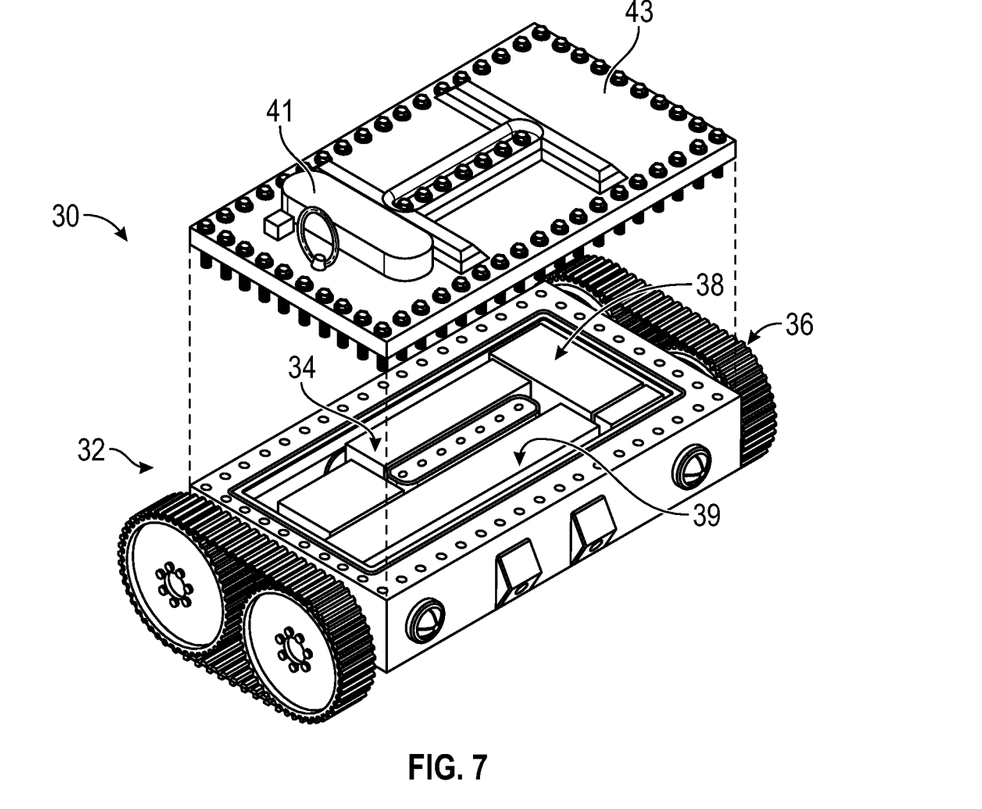
FIG. 7 illustrates a non-limiting embodiment of a mobile platform that may be retrieved using a retrieval assembly according to the present disclosure.

Referring to FIG. 7, there is shown one non-limiting embodiment of the mobile platform 30, which can be retrieved in accordance with the present disclosure. The mobile platform 30 may include an enclosure 32, a control unit 34, a propulsion system 36, and a power supply 38. The propulsion system 36 may have some components such as motors and gears positioned inside the enclosure 32 and other components such as wheels or tracks positioned outside of the enclosure 32. Thus, at least a part of the propulsion system 36 is positioned at least partially inside the enclosure 32. The enclosure 32 includes a lid 43 that provides a sealed environment inside the enclosure 32 for the above-described components, as well as other components that may be carried by the mobile platform 30. Optionally, a task module 39 may also be carried by the mobile platform 30. As described below, the mobile platform 30 may also carry a retrieval module 41. As used herein, the term "carried by" means that the object is inside, attached to, or on the mobile platform 30. Hereafter, these structures and on-board equipment will collectively be referred to as "subsystems." In some embodiments, the control unit 34 communicates with one or more subsystems via a suitable communication network (not shown). The power supply 38 supplies power to one or more systems via a suitable power distribution network (not shown).

The mobile platform 30 may be considered "intelligent" because the control unit 34 controls the subsystems of the mobile platform 30 by using only previously programmed instructions and information acquired "real time" or "near real time" via on-board sensing instruments. That is, the mobile platform 30 may acquire information relevant to an assigned task and make decisions in furtherance of the completion of that task without human intervention. By way of example and not limitation, the control unit 34 may execute algorithms (not shown) to issue control signals for operating the propulsion system 36, managing the power supply 38, and operating one or more task modules 39. Therefore, the mobile platform 30 may not require any physical carrier to a location external to a tank 10 (FIG. 2) through which power or command signals are received in order to perform one or more selected tasks in the tank 10 (FIG. 2).

Figure 8A:
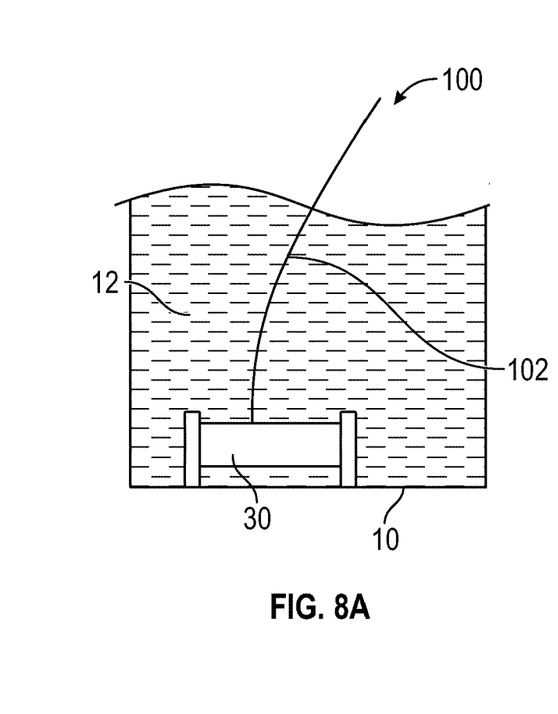
FIGS. 8A-C illustrate connection schemes that may be used to connect a mobile platform with a retrieval carrier in accordance with embodiments of the present disclosure.
Figure 8B:
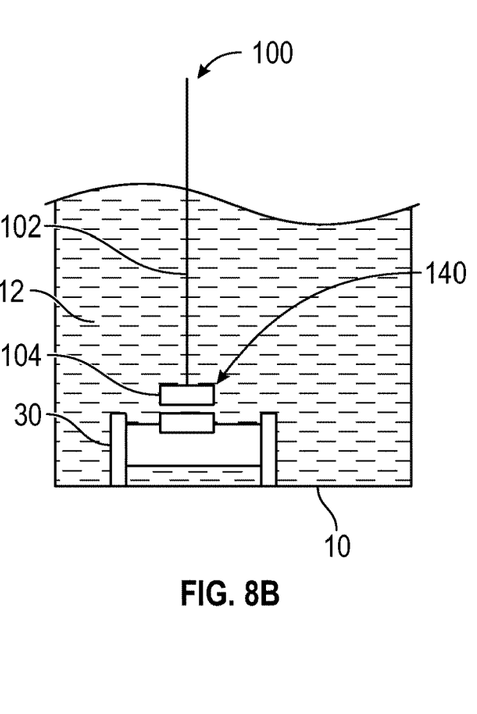
Figure 8C:
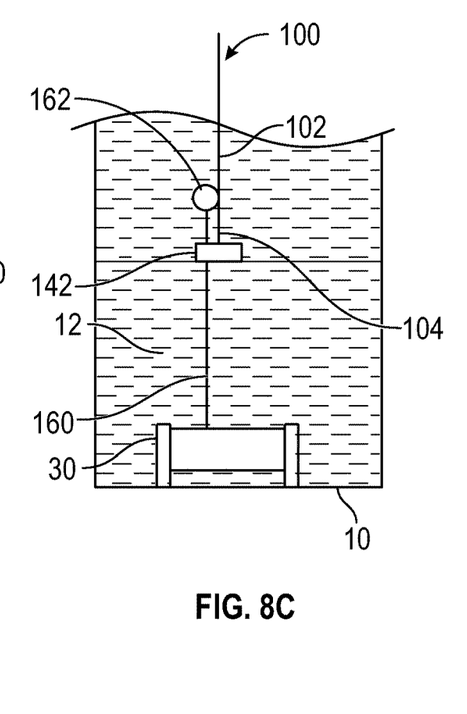

Referring to FIGS. 8A-C, there are shown non-limiting methods for using the retrieval carrier 100 to retrieve the mobile platform 30 from inside the tank 10. In the FIGS. 8A-C, the mobile platform 30 is shown fully submerged in a liquid energetic substance 12. However, in some situations, the mobile platform 30 may be partially submerged. In either case, at least a portion of the intermediate span 102 of the retrieval carrier 100 may contact and retain a residue of the liquid energetic substance 12.

Referring to FIG. 8A, the retrieval carrier 100 is shown connected to the mobile platform 30 while the mobile platform 30 is performing one or more desired tasks inside the tank 10. The connection may be made before the mobile platform 30 is inserted into the tank 10 or after the mobile platform 30 is inserted into the tank 10.

Referring to FIG. 8B, there is shown one non-limiting method for connecting the retrieval carrier 100 to the mobile platform 30 only after the mobile platform 30 has been inserted into the tank 10. The retrieval carrier 100 may include a connector 140 provided at the attachment end 104. The connector 140 may be a hook, clasp, magnetic element or other device that physically engages the mobile platform 30 and allows lifting and handling of the mobile platform 30 by manipulating the retrieval carrier 100.

Referring to FIG. 8C, there is shown another non-limiting method for connecting the retrieval carrier 100 to the mobile platform 30 only after the mobile platform 30 has been inserted into the tank 10. The retrieval carrier 100 may also include the connector 140 provided at the attachment end 104. In this embodiment, the mobile platform 30 includes a tether 160 that is connected to a buoyant body 162. The tether 160 and the buoyant body 162 may be released from a retrieval module 41 (FIG. 7) carried by the mobile platform 30. While shown as one tether 160, the tether 160 may configured as a multiple stage tether system having two or more tethers, each of which is configured to perform a different function. The connector 140 may be a hook, clasp, magnetic element or other device that physically engages the tether 160 and/or buoyant body 162. The connection between the connector 140 and the tether 160 and/or the buoyant body 162 may be used to lift and/or handle the mobile platform 30 by manipulating the retrieval carrier 100. In such an arrangement, some or all of the tether 160 may pass through the energetic substance extractor 240 (FIG. 2) in the same manner as the intermediate span 102 of the retrieval carrier 100. Thus, certain components of the retrieval module 41 (FIG. 7), such as the tether 160, may be considered a part of the retrieval carrier 100. Also, the connection between the connector 140 and the tether 160 and/or the buoyant body 162 may be used to guide the connector 140 toward the mobile platform 30 and to enable the connector 140 to connect to the mobile platform 30. Because the "attachment end" generally defines a juncture at which the retrieval carrier 100 connects to the mobile platform 30, the "attachment end" may be the attachment end 104a, which is proximate to the mobile platform 30 as opposed to proximate to the buoyant body 162.

Figure 9:
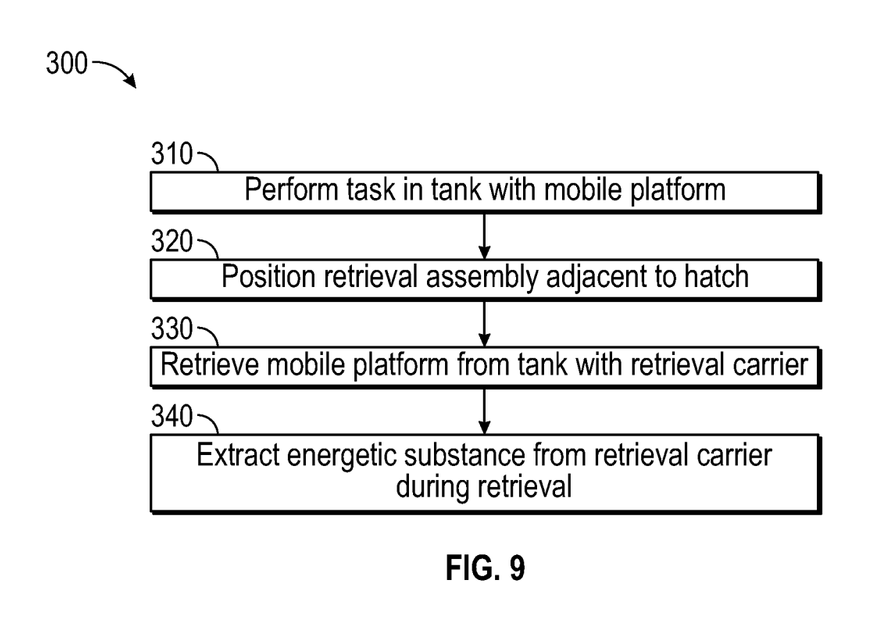
FIG. 9 schematically illustrates a method of retrieval of a mobile platform from a tank having energetic substances according to one embodiment of the present disclosure.

A non-limiting method of retrieving a mobile platform or other equipment from a tank will be described with reference to FIGS. 2, 7 and 9. FIG. 9 depicts a flowchart illustrating a non-limiting method 300 for retrieving the mobile platform 30 from inside of the tank 10 having energetic substances 12, 14.

At step 310, the mobile platform 30 is moved inside the tank 10 using the propulsion system 36 to perform one or more selected tasks inside the tank 10. The mobile platform 30 is submerged in a liquid energetic substance 12 while performing the task(s).

At step 320, at least the energetic substance extractor 240 of the retrieval assembly 200 is positioned adjacent to the hatch 24. The other components of the retrieval assembly 200 may also be positioned adjacent to the hatch 24 or at other locations on the tank 10, on the ground adjacent to the tank 10, or structures adjacent to the tank 10.

At step 330, the mobile platform 30 is retrieved from inside the tank 10 by performing several steps: operating the retrieval winch 280 to pull the intermediate span 102 of the retrieval carrier 100 toward the retrieval winch 280; and passing the intermediate span 102 of the retrieval carrier 100 through the passage 254 while the intermediate span 102 of the retrieval carrier 100 is being pulled toward the retrieval winch 280. The intermediate span 102 of the retrieval carrier 100 passing through the passage 254 applies a torque at the rolling contact with the opposing surfaces 256, 258, which rotates the opposing surfaces 256, 258. It should be noted that that the retrieval carrier 100 may be passed two or more times through the opposing surfaces 256, 258 in order to extract the desired amount of liquid energetic substance 12 from the intermediate span 102. That is, the retrieval winch 280 may be operated to reverse the direction of the intermediate span 102 to pass through the same section of the intermediate span 102 through the opposing surfaces 256, 258 in opposing directions.

The attachment end 104 of the retrieval carrier 100 may be connected to the mobile platform 30 before the mobile platform 30 is conveyed into the tank 10. Alternatively, the attachment end 104 may be connected to the mobile platform 30 after moving the mobile platform 30 inside the tank 10. Thus, by way of example, the attachment end 104 may be connected to the mobile platform 30 before the mobile platform 30 is conveyed into the tank 10, or the attachment end 104 may be connected to the mobile platform 30 after the mobile platform 30 is conveyed into the tank 10 but before the mobile platform 30 is moved in the tank 10 using the at least one propulsion system 36, or the attachment end 104 may be connected to the mobile platform 30 after the mobile platform 30 is conveyed into the tank 10 and after the mobile platform 30 is moved in the tank 10 using the at least one propulsion system 36.

As described previously, at least some of the intermediate span 102 of the retrieval carrier 100 may have been submerged in the liquid energetic substance 12 and therefore retains a residue 40 of the liquid energetic substance 12 upon entering the passage 254.

At step 340, some or all of the residue 40 of the liquid energetic substance 12 is extracted from the retrieval carrier 100 by compressing the intermediate span 102 of the retrieval carrier 100 between the opposing surfaces 256, 258. The compression reduces the porosity of the intermediate span 102 passing between the opposing surfaces 256, 258 by reducing the amount of interstitial space in the portion of the intermediate span 102. By displacing the liquid energetic substance 12 in such interstitial spaces, the compression extracts from the intermediate span 102 in the passage 254 a majority of the residue 40 of the liquid energetic substance 12 retained by the intermediate span 102 of the retrieval carrier 100 upon entering the passage 254. The energetic substance extractor 240 may be positioned to allow the extracted residue 42 (FIG. 5) to drip into the tank 10. Two or more passes may be made by the same section of the intermediate span 102 through the opposing surfaces 256, 258.

It should be understood that the non-limiting method depicted by FIG. 9 is not limited to just the sequence of steps shown. For example, the positioning step 320 can occur before or after step 310; i.e., the positioning step 320 may occur at any time prior to, during, or after the mobile platform 30 is conveyed into the tank 10.

An "energetic substance" is any material that is considered to be at risk of igniting or burning. In certain applications, an energetic substance has one or more of the following properties: (i) an Autoignition Temperature (AIT) of 700° C. or less, (ii) a flashpoint of 150° C. or less, (iii) a Minimum Ignition Energy (MIE) of 1.5 mJ or less, and/or (iv) a Minimum Ignition Current Ratio (MICR) of 1.5 or less.

An AIT is the minimum temperature required to initiate or cause self-sustained combustion of a material independently of the heating or heated element. A flashpoint is the minimum temperature at which a liquid gives off vapor in sufficient concentration to form an ignitible mixture with air near the surface of the liquid at standard atmospheric conditions. A MIE is the minimum energy required from a capacitive spark discharge to ignite the most easily ignitible mixture of a gas or vapor. A MICR is the ratio of the minimum current required from an inductive spark discharge to ignite the most easily ignitible mixture of a gas or vapor, divided by the minimum current required from an inductive spark discharge to ignite methane under the same test conditions.

Energetic substances can be dust, particulates, slurries, solids, liquids, vapors, gases, and combinations thereof. Examples of energetic substances include, but are not limited to coal dust, hydrocarbon liquids, fuel oils, and gasoline.

It is emphasized that the present teachings can be readily applied to a variety of industries and uses beyond retrieving equipment used inside tanks, whether above ground or underground. Thus, the described systems and methods are only illustrative of how the advancements of the present disclosure may be implemented. For example, retrieval methods according to the present disclosure may be used in connection with equipment used in storage units and containers carried by barges, tankers, railroad cars, or ships.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. Thus, it is intended that the following claims be interpreted to embrace all such modifications and changes.

I claim:

1. A method for retrieving a mobile platform from inside a tank having a hatch and at least partially filled with an energetic substance, the method comprising:
 configuring a retrieval carrier to have at least an intermediate span and an attachment end, wherein a majority of a cross-sectional area of the intermediate span includes a braided synthetic fiber rope having a porosity of at least ten percent, wherein the braided synthetic fiber rope has an elastic compressibility sufficient to reduce the porosity of the braided synthetic fiber rope by at least fifty percent, wherein the intermediate span does not have a fluid tight passage enabling fluid communication between a location outside of the tank and the mobile platform;
 configuring the mobile platform to have at least: at least one enclosure and at least one propulsion system positioned at least partially inside the at least one enclosure;
 configuring a retrieval assembly to have at least: a retrieval frame, an energetic substance extractor, and a retrieval winch, wherein the retrieval frame supports the retrieval carrier, the energetic substance extractor is positioned between the retrieval frame and the mobile platform, and the retrieval winch is connected to the retrieval carrier;
 configuring the energetic substance extractor to have at least: a plurality of opposing surfaces defining a passage, the passage being sized to cause the opposing surfaces to have rolling contact with and compress the intermediate span of the retrieval carrier in the passage;
 moving the mobile platform in the tank using the at least one propulsion system while the mobile platform is submerged in a liquid energetic substance;
 positioning at least the energetic substance extractor of the retrieval assembly adjacent to the hatch;
 retrieving the mobile platform from inside the tank using the retrieval carrier, wherein the retrieval carrier is connected to the mobile platform by the attachment end, the retrieving done by at least:
 operating the retrieval winch to pull the intermediate span of the retrieval carrier toward the retrieval winch, and
 passing the intermediate span of the retrieval carrier through the passage while the intermediate span of the retrieval carrier is being pulled to the retrieval winch,
 wherein the intermediate span of the retrieval carrier passing through the passage applies a torque at the rolling contact with the plurality of the opposing surfaces, and wherein the applied torque rotates the opposing surfaces, and
 wherein the intermediate span of the retrieval carrier was submerged in the liquid energetic substance and retains a residue of the liquid energetic substance upon entering the passage; and
 compressing the intermediate span of the retrieval carrier between the plurality of the opposing surfaces, wherein the compression extracts from the intermediate span in the passage a majority of the residue of the liquid energetic substance retained by the intermediate span of the retrieval carrier upon entering the passage.

2. The method of claim 1, wherein the energetic substance extractor is positioned to allow the majority of the residue of the liquid energetic substance extracted from the intermediate span in the passage to drip into the tank.

3. The method of claim 1, wherein the retrieval carrier does not transfer electrical power from outside of the tank to the mobile platform.

4. The method of claim 1, wherein the retrieval carrier does not transfer data signals from outside of the tank to the mobile platform.

5. The method of claim 1, wherein the passage separating the plurality of the opposing surfaces against which the retrieval carrier is compressed has at least one section that is no greater than 0.5 inches (1.27 centimeters).

6. The method of claim 1, wherein the energetic substance extractor forms the intermediate span of the retrieval carrier into a cross-sectional shape having a width (W) to a height (Hc) ratio of greater than five to one, the width being measured along an axis of rotation of at least one of the plurality of the opposing surfaces and the height (Hc) being defined by the passage separating the plurality of the opposing surfaces and along an axis perpendicular to the axis of rotation.

7. The method of claim 1, wherein a majority of a perimeter of the intermediate span of the retrieval carrier contacts the plurality of the opposing surfaces while in the passage.

8. The method of claim 1, wherein the attachment end of the retrieval carrier is connected to the mobile platform before the mobile platform is moved inside the tank using the at least one propulsion system.

9. The method of claim 1, wherein the attachment end of the retrieval carrier is connected to the mobile platform after moving the mobile platform using the at least one propulsion system.

10. The method of claim 1, wherein the retrieval frame includes a pulley positioned vertically above the hatch.

11. The method of claim 1, wherein compressing the intermediate span of the retrieval carrier between the plurality of the opposing surfaces reduces the porosity of the intermediate span of the retrieval carrier between the plurality of the opposing surfaces by at least 50%.

12. The method of claim 7, wherein at least eighty percent of the perimeter of the intermediate span of the retrieval carrier contacts the plurality of the opposing surfaces while in the passage.

13. The method of claim 7, wherein the perimeter is defined by one of: (i) outer surfaces 127 of outermost fibers of the braided synthetic fiber rope, and (ii) an outer surface of an outer sheath of the intermediate span.

* * * * *